US006609705B1

(12) United States Patent
Schindler et al.

(10) Patent No.: US 6,609,705 B1
(45) Date of Patent: Aug. 26, 2003

(54) DEVICE FOR THE FLOATING CLAMPING OF A WORKPIECE TO BE MACHINED

(75) Inventors: Reinhard Schindler, Kronau (DE); Josef Eipl, Malsch (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/538,140

(22) Filed: Mar. 29, 2000

(30) Foreign Application Priority Data

Mar. 29, 1999 (DE) ........................................ 199 14 011

(51) Int. Cl.[7] ................................................ B23Q 3/08
(52) U.S. Cl. .............................. 269/34; 269/20; 269/32
(58) Field of Search ............................... 269/34, 32, 3, 269/6, 25, 27, 900, 20

(56) References Cited

U.S. PATENT DOCUMENTS 2,506,219 A * 5/1950 James ........................ 269/32
2,979,032 A 4/1961 Engquist et al.
3,899,162 A * 8/1975 Fischer ........................ 269/25
4,669,161 A * 6/1987 Sekelsky, Jr. ................ 269/32
4,844,431 A * 7/1989 Camp et al. .................. 269/25
4,877,228 A * 10/1989 Ripert ........................ 269/156

FOREIGN PATENT DOCUMENTS

DE 3031778 C2 8/1982
DE 4109162 A1 10/1991
DE 19512664 A1 10/1996

* cited by examiner

*Primary Examiner*—Lee D. Wilson
(74) *Attorney, Agent, or Firm*—Laurence A. Greenberg; Werner H. Stemer; Ralph E. Locher

(57) ABSTRACT

A device for the floating clamping of a workpiece to be machined. The device has a pair of clamping pistons and a pair of clamping jaws which are capable of being advanced onto mutually opposite sides of the workpiece with the aid of the two clamping pistons so as to exert a clamping force acting on the workpiece. The device is configured to contain a fixedly articulated collet chuck formed by a pair of clamping levers with clamping jaws and defining a chuck opening.

14 Claims, 4 Drawing Sheets

DEVICE FOR THE FLOATING CLAMPING OF A WORKPIECE TO BE MACHINED

BACKGROUND OF THE INVENTION

Field of the Invention

The invention relates to a device for floating clamping of a workpiece to be machined. The device has a pair of clamping pistons and a pair of clamping jaws which are capable of being advanced onto mutually opposite sides of the workpiece with the aid of the two clamping pistons so as to exert a clamping force acting on the workpiece.

A device of this type is commercially available and may be obtained, for example, under the type designation B1.893 from Römheld, D-35321 Laubauch, Germany. A first clamping cylinder of the known device is formed of a cylinder housing capable of being attached at a fixed location to a base, such as, for example, a machine table or a base plate of a clamping device, and a first supporting piston which is guided in the cylinder housing. The first support piston which, at a supporting-piston end projects out of the cylinder housing, carries a first clamping jaw connected fixedly to the supporting piston and projecting laterally relative to a longitudinal axis of the first supporting piston. The supporting piston forms, in turn, a cylinder housing, in which is guided coaxially to the first supporting piston a second supporting piston which, at an end of the second supporting piston protecting beyond the first supporting piston at the supporting-piston end of the latter carrying the first clamping jaw, carries a second clamping jaw connected fixedly to the second supporting piston and likewise projecting laterally. The second supporting piston has formed on it a piston annular surface facing the second clamping jaw carried by the second supporting piston. The piston annular surface has located opposite it a corresponding inner annular surface formed on the first supporting piston. The first clamping cylinder is configured to be double-acting, in such a way that the first supporting piston, when loaded by a pressurized hydraulic fluid via a first connection of the cylinder housing, assumes, by overcoming a counter-force applied by a spring configuration, an initial position in which the supporting piston is retracted into the cylinder housing. When there is a reduction in pressure at the first connection and loading via a second connection, the first supporting piston is capable, with the assistance of the counter-force of the spring configuration, of being moved into a position which is fixed by a stop and in which the supporting piston is extended out of the cylinder housing. At the same time, hydraulic fluid introduced via the second connection passes into an annular space formed between the annular surfaces explained further above (the piston annular surface on the second supporting piston and the inner annular surface on the first supporting piston), and, after a reduction in pressure has taken place at the first connection and therefore also in the cylinder housing formed by the first supporting piston, causes the second supporting piston to be retracted into the cylinder housing formed by the first supporting piston, so that, when the device is loaded with the hydraulic fluid via the second connection, the two clamping jaws move toward one another and, assuming an appropriate configuration and adaption of the geometry of the device, are capable of being advanced onto mutually opposite sides of the workpiece already clamped in a statically defined manner, under a clamping force acting on the workpiece.

By the device being loaded by the hydraulic fluid via a third connection, the first supporting piston can be detained in a position assumed by the latter, in such a way that the supporting piston can be loaded without any reaction on the hydraulic fluid. For this purpose, the cylinder housing guiding the first supporting piston is provided with an annular chamber communicating with the third connection and has an inner wall which guides the first supporting piston and which is capable, under the pressure of the hydraulic fluid, of being pressed onto the outer surface of the first supporting piston, so that the first supporting piston can be detained frictionally. By contrast, a load exerted on the second supporting piston and acting counter to the clamping force when a workpiece clamped by use of the device is machined on both sides reacts directly on the hydraulic fluid and may cause the second clamping jaw to yield.

In order to avoid inadmissibly high tilting moments on the supporting pistons, the laterally projecting clamping jaws are relatively short, so that the device has to be placed very close to a workpiece to be clamped by it. The geometry of the workpieces to be clamped therefore places narrow limits on the use of the device.

Moreover, the frictional forces caused by the tilting moments and occurring, in particular, between the two supporting pistons make it necessary to use a relatively high pressure of the hydraulic fluid in order to generate the necessary clamping force.

Although the known device makes it possible to reduce its clamping range by a corresponding adjustment of setscrews provided in the clamping jaws, an increase in the clamping range necessitates a lengthening of the second supporting piston and an accompanying greater dimensioning of the device as a whole, since a lengthened second supporting piston must also have increased bending resistance. A given device of the known type, to that extent, also cannot be converted to greater clamping widths.

SUMMARY OF THE INVENTION

It is accordingly an object of the invention to provide a device for the floating clamping of a workpiece to be machined which overcomes the above-mentioned disadvantages of the prior art devices of this general type, which is configured in such a way as to obtain as wide a field of use as possible for it.

With the foregoing and other objects in view there is provided, in accordance with the invention, a device for floating clamping a workpiece to be machined, including:

two clamping pistons; and a fixedly articulated collet chuck actuated by the two clamping pistons, the collet chuk having a pair of clamping levers with two clamping jaws capable of being advanced onto mutually opposite sides of the workpiece with an aid of the two clamping pistons so as to exert a clamping force acting on the workpiece, and the pair of clamping levers and two clamping jaws defining a chuk opening.

To achieve the object, the device initially mentioned is developed to the effect that it is equipped with the collet chuck formed from the pair of clamping levers and the clamping jaws and defining a chuk opening, and a fixed articulation of the collet chuck is provided.

A device configured in this way ensures a relatively large free space for placing it in relation to the workpiece to be clamped and, for that reason, provides a relatively wide field of use. Furthermore, this can be widened, with the effect of increasing the clamping range, at relatively low outlay in order to convert a given device, in that, in a preferred embodiment, the collet chuck is merely replaced by one having a chuck opening of increased bit width. In this case, advantageously, the clamping pistons remain completely unaffected by the conversion.

In another preferred embodiment, at least one of the two clamping levers is composed of a fixedly articulatable first arm and of a second arm connectable to the first arm so as to have a variable width of the chuck opening. This entails a particularly low outlay in varying the clamping range of the device.

Advantageously, each of the two clamping pistons is capable of being detained under the action of a pressurized fluid and, after detention has taken place, of being loaded without any reaction on the fluid. In this preferred embodiment, it is unimportant on which of the two clamping jaws is absorbed a supporting force arising from a machining of the workpiece clamped between them, since neither of the clamping jaws can yield as a result of a reaction on the fluid.

In an advantageous development, after the advance of the clamping jaws onto the workpiece has taken place and before the clamping pistons have been detained, the collet chuck can be adjusted in terms of its pivoting position relative to the fixed articulation. There is therefore the possibility of correcting a variation in position of the workpiece which may have occurred during the advance of the clamping jaws onto the latter.

Other features which are considered as characteristic for the invention are set forth in the appended claims.

Although the invention is illustrated and described herein as embodied in a device for the floating clamping of a workpiece to be machined, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
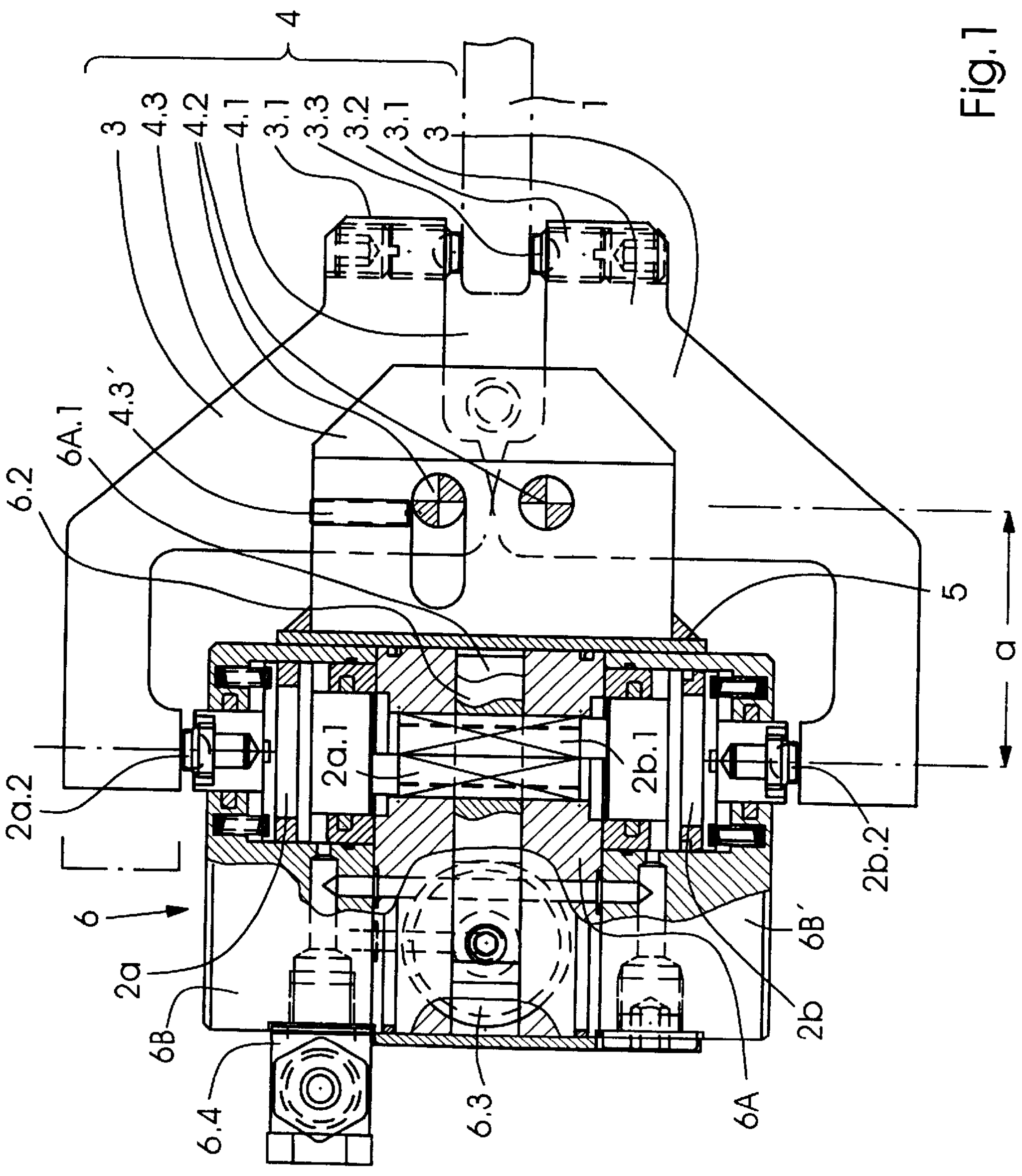
FIG. 1 is a diagrammatic, partially broken-away side-elevational view of a first embodiment according to the invention.

In all the figures of the drawing, sub-features and integral parts that correspond to one another bear the same reference symbol in each case. Referring now to the figures of the drawing in detail and first, particularly, to FIG. 1 thereof, there is shown a device, reproduced in a first embodiment in FIG. 1, for a floating clamping of a workpiece 1 to be machined. The device includes a first and a second clamping piston 2*a* and 2*b* and a pair of clamping jaws 3.1 which are capable of being advanced onto mutually opposite sides of the workpiece 1 with the aid of the two clamping pistons 2*a* and 2*b* so as to exert a clamping force acting on the workpiece 1. A collet chuck 4 or a workpiece clamping device 4 is formed by a pair of clamping levers 3 and the clamping jaws 3.1 and defines a chuck opening or chuck bit 4.1. The collet chuck 4 is articulated fixedly, so that the two clamping levers 3 can be pivoted in a common pivoting plane in a way varying a width of the chuck opening 4.1.

For this purpose, in the present exemplary embodiment, there is provided for each of the clamping levers 3 a pivot axis which is disposed between its ends and which is implemented by a bolt 4.2 passing through the clamping lever 3 perpendicularly to a pivoting plane and projecting beyond the respective clamping lever on both sides. The bolts 4.2 are mounted, at their ends projecting beyond the clamping levers 3, in a fork 4.3 partially surrounding the two clamping levers 3. The fork 4.3 is connected to a preferably parallelepipedic mounting block 5 which, in its corner regions, has threaded holes serving for screwing the mounting block 5 to a non-illustrated basic frame, which is fixed to a non-illustrated machine table, of a machine tool serving for machining the workpiece 1. The threaded holes are made preferably on each of the side faces of the mounting block 5, so that the latter can be screwed to the basic frame in various ways, that is to say the basic frame itself may be configured in various ways, so that the device can be used for a wide variety of machining tasks.

The mounting block 5 is disposed between the two clamping levers 3 and has a lathe-turned recess 5.1. A piston/cylinder configuration 6 containing the two clamping pistons 2*a* and 2*b* is inserted into the recess 5.1 in such a way that the two clamping pistons 2*a* and 2*b* have a common line of action which in each case passes through one end, facing away from the chuck opening 4.1, of one of the two clamping levers 3 in each case, specifically, in each case, at the same distance a from the pivot axes implemented by use of the bolts 4.2, when the two clamping levers 3 assume their clamping position reproduced by unbroken lines in FIG. 1.

A cylinder chamber of the piston/cylinder configuration 6, in each case guiding one of the two clamping pistons 2*a* and 2*b*, is connected to hydraulic lines in such a way that the two clamping pistons 2*a* and 2*b* can be jointly loaded by of the pressurized hydraulic fluid, to the effect that, in each case, one of the two clamping pistons 2*a* and 2*b* is supported in each case on one of the two clamping levers 3 and the collet chuck 4 therefore grips the workpiece 1 located between its clamping jaws 3.1, with a clamping force acting on the workpiece 1 between the clamping jaws 3.1.

For reasons of manufacture and assembly, the piston/cylinder configuration 6 contains housing portions 6A, 6B and 6B', apparent in FIG. 1, which are attached to one another in the longitudinal direction of the clamping pistons 2*a* and 2*b* and are connected to one another by non-illustrated fastening devices. Embodiments according to FIGS. 3 and 4, differing from FIG. 1 and with differently configured clamping-piston configurations, have correspondingly different housing 710 portions 6A', 6C (as regards FIG. 3) or 6A", 6A'" and 6D (as regards FIG. 4) which are adapted to the relevant conditions.

As already mentioned, the two clamping pistons (the clamping pistons 2*a* and 2*b* in the case of the embodiment according to FIG. 1) are capable of being detained under the action of a pressurized fluid and, after detention has taken place, of being loaded axially without any reaction on the fluid. Furthermore, in order to implement this, the piston/cylinder configuration 6 is configured with reference to the supporting configuration known from German Patent DE 195 12 664 C2. Specifically with reference to the exemplary embodiment which is disclosed in this publication and in which a supporting shank corresponding to one of the two clamping pistons 2*a* and 2*b* has, along a portion of the supporting shank, a cross-sectional profile differing from a circular surface and surrounded positively by guide-surface portions straight-guiding the supporting shank, and in which a clamping-device configuration, under the action of an adjusting force acting on it, exerts a torsional force on the supporting shank.

Figure 2:
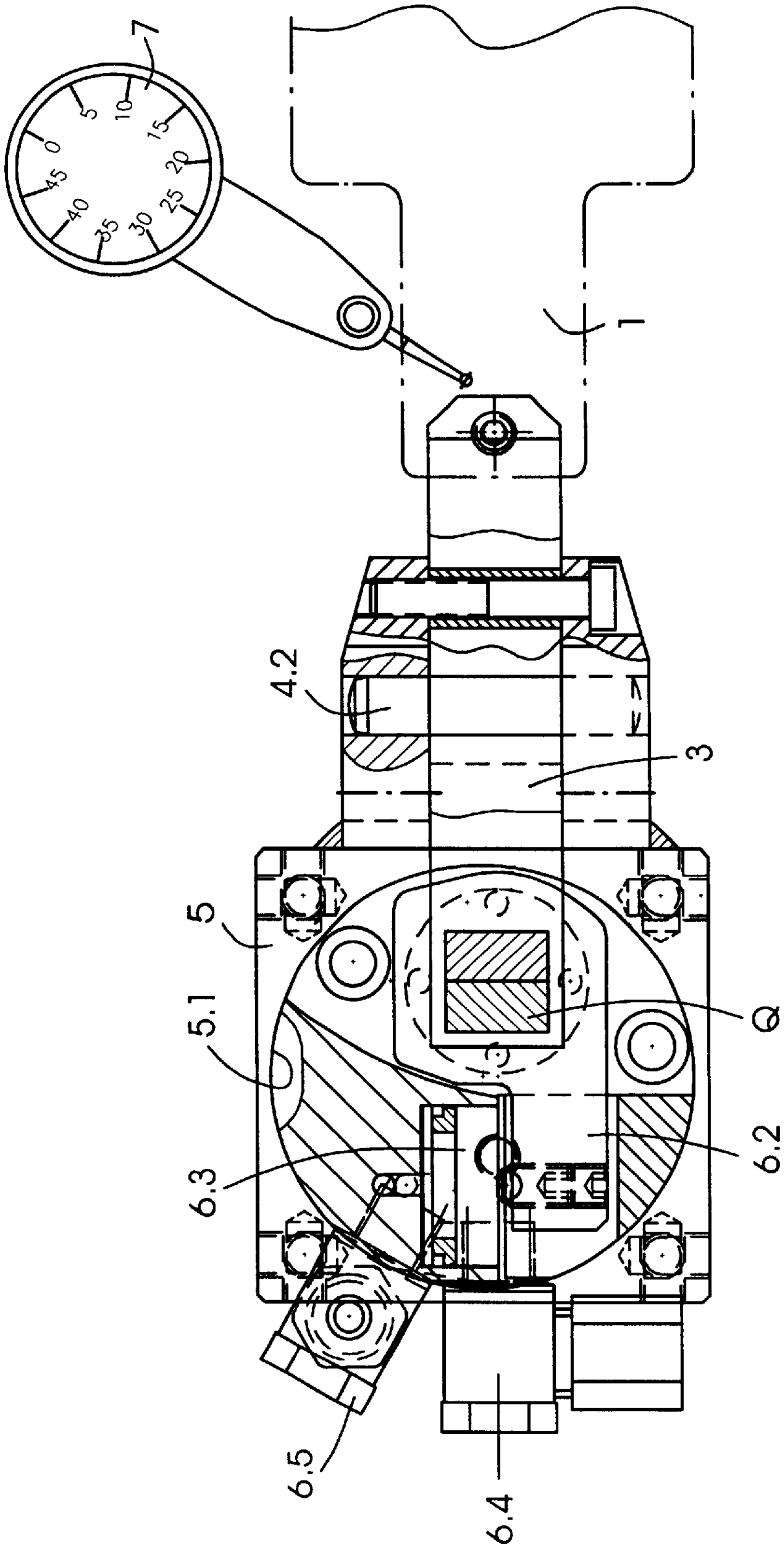
FIG. 2 is a partially broken-away top plan view of the embodiment according to FIG. 1.

Accordingly, in the exemplary embodiment according to FIG. 1, in each case one of the two clamping pistons 2*a* and 2*b* has a shank 2*a*.1 and 2*b*.1 having a cross section which is rectangular and, to that extent, differs from a circular surface, in such a way that the two shanks 2*a*.1 and 2*b*.1 as a whole fill a square cross section Q formed by the guide-surface portions (see FIG. 2). The housing portion 6A of the piston/cylinder configuration 6, the housing portion forming the guide-surface portions, has a clearance 6A.1 extended along a common portion of the two shanks 2*a*.1 and 2*b*.1 and transversely to these. Disposed in this clearance is a lever 6.2 which has a clearance engaging positively around the generally square cross section Q of the two shanks 2*a*.1 and 2*b*.1. The piston/cylinder configuration 6 contains, furthermore, a piston 6.3 which is likewise capable of being loaded with a pressurized fluid and, when loaded with this fluid, actuates the lever 6.2 engaging positively around the two shanks 2*a*.1 and 2*b*.1, in the manner of a wrench, and exerts a torsional force on the shanks 2*a*.1 and 2*b*.1. The pressure forces generated by the torsional force between the shanks 2*a*.1 and 2*b*.1, on the one hand, and the guide-surface portions engaging positively around the latter and provided in the housing 6.1 of the piston/cylinder configuration, on the other hand, detain the clamping pistons 2*a* and 2*b* previously advanced onto the two clamping levers 3 and make the clamping pistons capable of being loaded axially without reaction on the pressurized fluid loading the piston 6.3. Thus, under the action of machining forces, such as occur, in particular, during machining illustrated in FIG. 3, the workpiece 1 clamped between the clamping jaws 3.1 maintains its position, even when these machining forces exceed the clamping force exerted by the clamping jaws 3.1.

The feed of pressurized fluid takes place, in the event of the advance of the clamping pistons 2*a* and 2*b*, via a screw-in union 6.4 inserted into the piston/cylinder configuration 6 and, in the event of the detention of the clamping pistons 2*a* and 2*b*, via a corresponding screw-in union 6.5 illustrated in FIG. 2.

In order to allow unimpeded insertion and extraction of the workpiece 1 into and out of the clamping device which contains the device, that of the two clamping levers 3 which is the upper in the case illustrated in FIG. 1, when in its state not actuated by the clamping piston 2*a*, is displaceable out of its position located with its clamping jaw 3.1 opposite the workpiece in the direction of the mounting block 5, in such a way that the clamping jaw 3.1 assumes a position located outside the plan contour of the workpiece 1.

For this purpose, the bolt 4.2 belonging to the upper clamping lever 3 is received in corresponding long holes of the fork 4.3. In order to maintain the position of the lever 3, which is intended for clamping the workpiece 1 and in which the pivot axis of the clamping lever 3, the pivot axis being implemented by the associated bolt 4.2, assumes a distance a from the common line of action of the two clamping pistons, at least one securing screw 4.3' capable of being advanced onto 4 the bolt 4.2 is provided in the fork 4.3.

Figure 3:
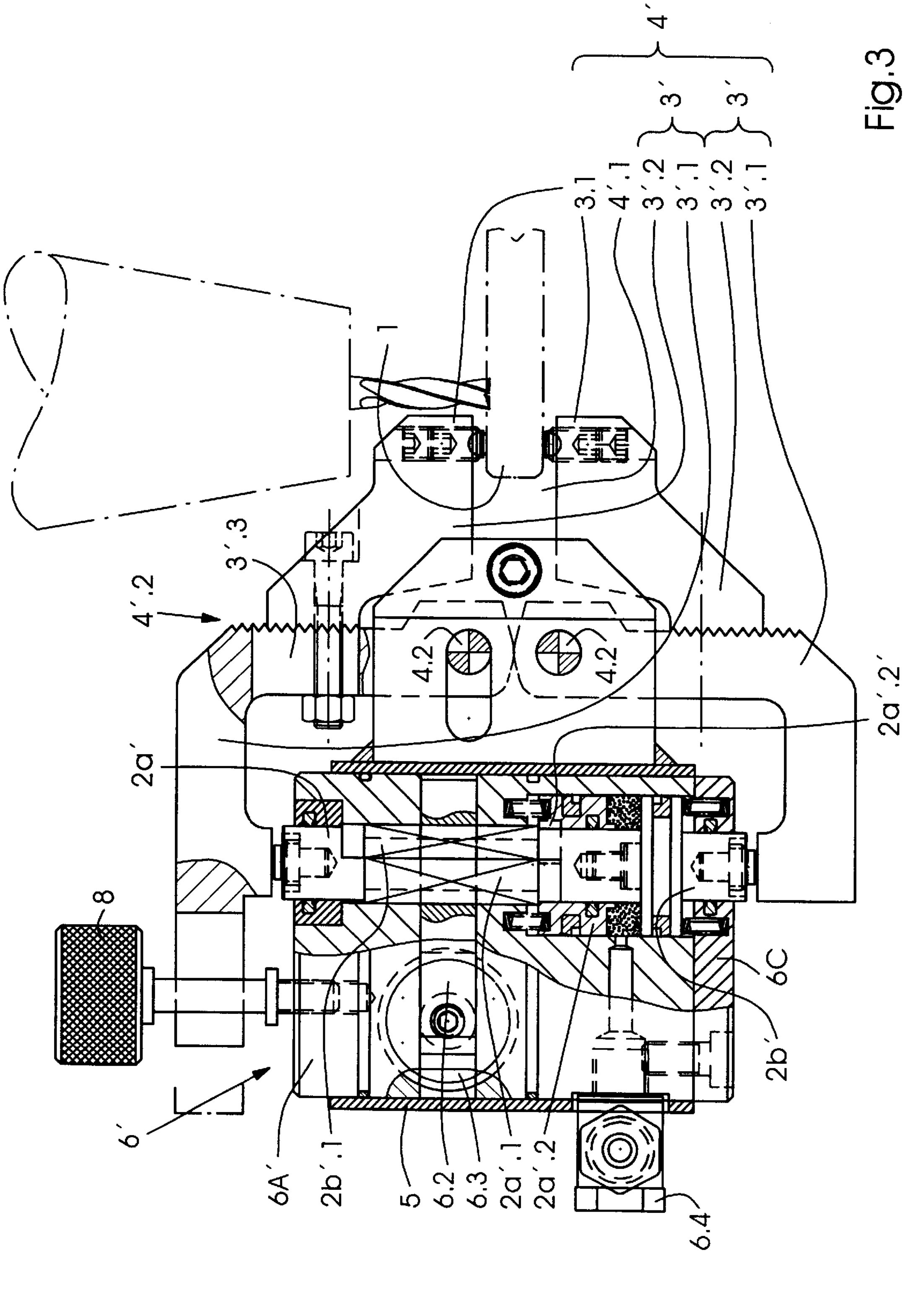
FIGS. 3 and 4 are partially broken-away side-elevational views of embodiments that are modified, as compared with FIG. 1.
Figure 4:
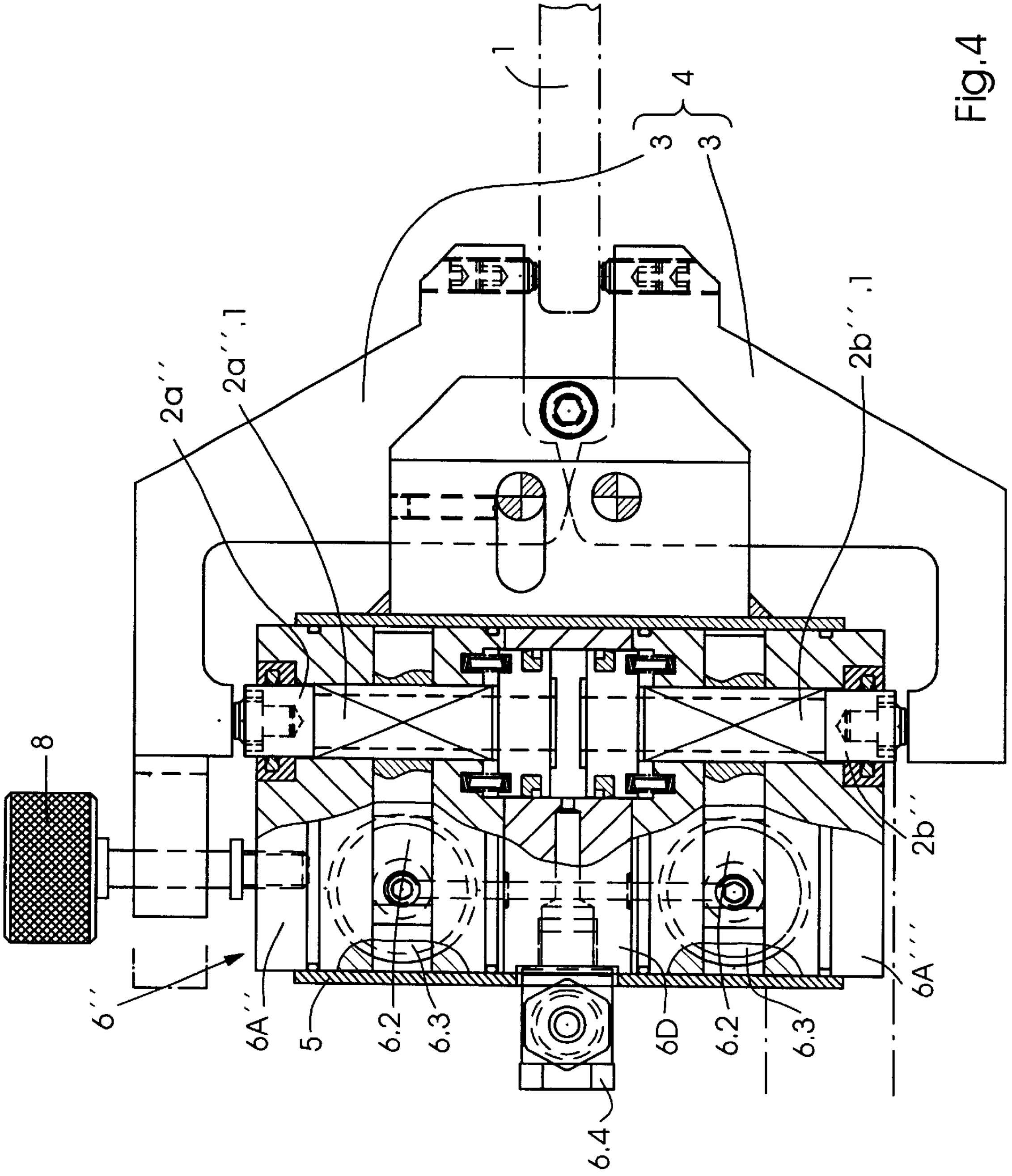

In the present example, a tracer of a dial gage 7, reproduced in FIG. 2 and held by a non-illustrated mounting, is advanced onto a top side of the workpiece 1. The dial gage 7 is set to zero before the clamping pistons 2*a* and 2*b* are loaded with the pressurized fluid. After the loading of the clamping pistons 2*a* and 2*b* has then taken place, the dial gage 7 swings in one direction or the other, as appropriate, and, consequently, it is possible to detect a deviation of the workpiece 1 from its previously assumed position which has occurred as a result of a pivoting of the collet chuck 4 in relation to its fixed articulation via the bolts 4.2. The position can be restored by an adjustment of the collet chuck 4. For this purpose, as can be seen in FIGS. 3 and 4, an adjusting screw 8 is provided, which is screwed into a fixed mounting and which cooperates with one of the clamping levers 3 in such a way that, when the adjusting screw 8 is rotated in a suitable direction, the clamping lever 3, and therefore the collet chuck 4, experiences a change in position opposite to the pivoting which has taken place. This change in position is then carried out, the dial gage 7 being observed at the same time, until that position is reached in which the dial gage 7 is at zero again. In this case, the clamping pistons 2*a* and 2*b* remain in bearing contact on the clamping levers 3. After the zero position of the dial gage 7 has been reached, the clamping pistons 2*a* and 2*b* are then detained in the way already described.

As illustrated by way of example in FIGS. 3 and 4, the fixed mounting provided for the adjusting screw 8 is preferably in each case the housing portion 6A' or 6A" which forms, inter alia, at least part of the guide-surface portions.

One of the clamping jaws 3.1 in each case has preferably inserted in it a setscrew 3.2 which projects beyond it in the direction of the workpiece 1 to be clamped and which in each case carries a thrust piece 3.3 facing the workpiece 1 and received by a ball-and-socket mounting in the setscrew 3.2.

The device is, admittedly, so placed overall and, in particular, as regards the width of the chuck opening in the position of the latter gripping the workpiece 1, so adapted to the workpiece 1 that, ideally, the ball-and-socket mounting could be dispensed with. If there are some deviations from the ideal situation, for example in the case of tolerances in the geometry of the workpiece 1, however, the ball-and-socket mounting, even then, ensures that the thrust pieces 3.3 come to bear snugly on the workpiece 1. Furthermore, supporting surfaces for the clamping pistons 2*a* and 2*b* are formed on the clamping levers 3 in such a way that, ideally, these supporting surfaces lie perpendicularly to the common line of action of the clamping pistons 2*a* and 2*b* when the clamping jaws 3.1 grip the workpiece 1. In the above-mentioned case of some deviations from the ideal situation, there are also preferably provided, on those end faces of the clamping pistons 2*a* and 2*b* which face the clamping levers 3, thrust pieces 2*a*.2 and 2*b*.2 which project beyond the end faces and are in each case received by a ball-and-socket mounting, so that, even then, a snug bearing contact of the clamping pistons 2*a* and 2*b* on the respective clamping lever 3 is still ensured.

In principle, the configuration of corresponding thrust pieces on those ends of the clamping levers 3 which are located opposite the clamping pistons 2*a* and 2*b* also fulfills the same purpose. However, the above-mentioned configuration affords a variant that is more cost-effective, should the clamping levers 3 be replaced by clamping levers with a different clamping width of the chuck opening.

The exemplary embodiment reproduced in FIG. 3 shows a solution which, in terms of adapting the clamping width of the chuck opening 4'.1 of a collet chuck 4' provided here, differs from the exchange of clamping levers. In this case, at least one of the two clamping levers 3' is composed, at a parting plane 4'.2, of a first arm 3'.1, which is articulated fixedly in a way corresponding to FIG. 1, and of a second arm 3'.2 containing the clamping jaw 3.1, the parting plane 4'.2 preferably running parallel to a plane which is spanned by the pivot axes formed by the bolts 4.2 and which, in turn, runs parallel to the line of action, common in this exemplary embodiment, too, of clamping pistons 2*a*' and 2*b*' provided in this case.

The first and second arms 3'.1 and 3'.2 can be screwed to one another in mutual bearing contact at the parting plane 4'.2, there being provided in one of the two arms 3'.1 and 3'.2, for the passage of a corresponding screw union, a long hole 3'.3 which is configured for setting different clamping widths of the chuck opening 4'.1.

The surfaces of the first and of the second arm 3'.1 and 3'.2 which are capable of being joined to one another at the parting plane 4'.2 are preferably provided with grooves in each case identical to one another and lined up next to one another, in such a way that, when the first and second arms 3'.1 and 3'.2 are in the position in which they are joined to one another, the grooves engage positively one into the other and, in the intended position of the collet chuck 4', run parallel to the bolts 4.2. The clamping width of the chuck opening 4'.1 can therefore be varied in steps which correspond to the mutual distance between the grooves.

Furthermore, the exemplary embodiment reproduced in FIG. 3 differs from that according to FIG. 1 in the structure of a piston/cylinder configuration 6' inserted into the mounting block 5. The difference relates to the way in which the clamping pistons 2*a*' and 2*b*' provided here are loaded by the pressurized fluid, under the action of which the collet chuck 4' engages around the workpiece 1. For this purpose, an auxiliary piston 2*a*'.2 disposed opposite the effective annular surface of the second clamping piston 2*b*' is provided. The auxiliary piston is disposed slideably along a cylindrical portion of the piston rod of the second clamping piston 2*b*' and delimits a cylinder chamber enclosed between itself and the effective annular surface of the second clamping piston 2*b*'. When this cylinder chamber communicating with the screw-in union 6.4 is loaded, the auxiliary piston 2*a*'.2 presses onto the end face, facing the latter, of the shank 2*a*'.1, already explained with reference to FIG. 1, of the first clamping piston 2*a*', the shank being configured with a rectangular cross section. In this case, a corresponding endface clearance 2*a*'.2' of the auxiliary piston 2*a*'.2 prevents a collision of the latter with the shank 2*b*'.1, of rectangular cross section, of the second clamping piston 2*b*'. Otherwise, as regards the detention of the clamping pistons 2*a*' and 2*b*', the structure of the piston/cylinder configuration 6' is similar to that of the exemplary embodiment according to FIG. 1.

FIG. 4 reproduces an embodiment, in which, by way of example, the collet chuck 4 according to FIG. 1 is provided, but the collet chuck 4 is capable of being actuated by a piston/cylinder configuration 6" differing from this and inserted into the mounting block 5. The piston/cylinder configuration 6" contains a middle housing portion 6D, above and below which there are adjoining housing portions 6A" and 6A'" configured at least essentially mirror-symmetrically. The middle housing portion 6D forms, for a first and a second clamping piston 2*a*" and 2*b*", a cylinder chamber which is common to these and communicates with the screw-in union 6.4 and in which the effective piston surfaces of the first and second clamping pistons 2*a*" and 2*b*" are located opposite one another. In the housing portion 6A" or 6A'" which adjoins in each case, a shank 2*a*".1 or 2*b*".1, of square cross section, of the respective clamping piston 2*a*' or 2*b*" has corresponding guide-surface portions engaging positively around it, the lever 6.2 corresponding to the examples according to FIGS. 1 to 3 is provided and the piston 6.3 intended for actuating the lever 6.2, as already described, is disposed. The two clamping pistons 2*a*" and 2*b*", like the clamping pistons 2*a* and 2*b* or 2*a*' and 2*b*' of the above-described embodiments, possess a common line of action and identical effective piston surfaces. Further explanations of the cooperation of the shanks provided in the respective embodiments and having a cross section differing from a circular surface, on the one hand, and the guide-surface portions engaging around these shanks, on the other hand, can be taken from German Patent DE 195 12 664 C2 already mentioned, which is hereby incorporated by reference.

We claim:

1. A device for floating clamping a workpiece to be machined by a machine tool, comprising:

- a mounting block fixed to the machine tool;
- two clamping pistons disposed in said mounting block; and
- a fixedly articulated collet chuck actuated by said two clamping pistons, said collet chuck having a pair of clamping levers with two clamping jaws capable of being advanced onto mutually opposite sides of the workpiece with an aid of said two clamping pistons so as to exert a clamping force acting on the workpiece, said pair of clamping levers being fixedly articulated with respect to said mounting block, and said pair of clamping levers and two clamping jaws defining a chuck opening, at least one of said pair of clamping levers being composed of a fixedly articulatable first arm and of a second arm connectable to said fixedly articulatable first arm so as to define a variable width of said chuck opening.

2. A device for floating clamping a workpiece, comprising:

- a machine tool for machining the workpiece;
- a mounting block fixed to said machine tool;
- a pair of clamping pistons disposed in said mounting block and having:
  - working positions;
  - a common line of action with a given stroke; and
  - shanks having non-circular cross-sections;
- a pair of clamping levers each having a front portion, a rear portion facing a respective one of said clamping pistons, and an intermediate portion pivotally connected to said mounting block to form a collet chuck, said front portion of said clamping levers defining a pair of jaws that, together with said given stroke of said clamping pistons, defining a chuck opening having a width within a given range;
- an adjusting device connected to said clamping levers for moving said front portion of said clamping levers and said jaws into contacting positions in which said jaws are, with a given force, to be abutted upon said workpiece at opposed sides thereof, said adjusting device including:
  - said pair of clamping pistons; and
  - a first hydraulic system connected to and actuating said clamping pistons; and
- a locking device connected to and locking said clamping pistons in said working positions in which said jaws are in workpiece-contacting positions, said locking device having:

a second hydraulic system;

said shanks;

form locking guide-surface portions receiving said shanks; and a lever connected to said second hydraulic system and twisting said shanks.

3. The device according to claim 2, wherein after said jaws have been moved into said workpiece-contacting positions and before said clamping pistons have been locked in said working positions, said collet chuck adjusts into pivoting positions.

4. The device according to claim 2, wherein at least one of said pair of clamping levers is composed of:

a fixedly articulatable first arm: and a second arm variably connected to said fixedly articulatable first arm to define a variable width of said chuck opening.

5. The device according to claim 3, wherein after said jaws have been moved into said workpiece-contacting positions and before said clamping pistons have been locked in said working positions, said collet chuck adjusts into a pivoting position.

6. The device according to claim 2, including adjusting means adapted for adjusting a pivoting position of said collet chuck after said jaws have been moved into said workpiece-contacting positions and before said clamping pistons have been locked in said working positions.

7. A device according to claim 2, wherein said clamping levers are each composed of:

a fixedly articulatable first arm; and a second arm connected to said fixedly articulatable first arm, said second arms being connectable to said first arms at different mutual distances.

8. A device for floating clamping a workpiece to be machined by a machine tool, comprising;

a mounting block fixed to the machine tool;

two clamping pistons disposed in said mounting block; and a fixedly articulated collet chuck actuated by said two clamping pistons, said collet chuck having a pair of clamping levers with two clamping jaws capable of being advanced onto mutually opposite sides of the workpiece with an aid of said two clamping pistons so as to exert a clamping force acting on the workpiece, said pair of clamping levers being fixedly articulated with respect to said mounting block, and said pair of clamping levers and two clamping jaws defining a chuck opening, said clamping levers each being composed of a fixedly articulatable first arm and of a second arm connectable to said fixedly articulatable first arm, said second arms being connectable to said first arms at different mutual distances.

9. A device for floating clamping a workpiece to be machined by a machine tool, comprising:

a mounting block to be fixed to the machine tool;

a pair of clamping pistons disposed in said mounting block and having:

working positions;

a common line of action with a given stroke; and shanks having non-circular cross-sections;

a pair of clamping levers each having a front portion, a rear portion facing a respective one of said clamping pistons, and an intermediate portion pivotally connected to said mounting block to form a collet chuck, said front portion of said clamping levers defining a pair of jaws that, together with said given stroke of said clamping pistons, defining a chuck opening having a width within a given range;

an adjusting device connected to said clamping levers for moving said front portion of said clamping levers and said jaws into contacting positions in which said jaws are, with a given force, to be abutted upon said workpiece at opposed sides thereof, said adjusting device including:

said pair of clamping pistons; and a first hydraulic system connected to and actuating said clamping pistons; and a locking device connected to and locking said clamping pistons in said working positions in which said jaws are in workpiece-contacting positions, said locking device having:

a second hydraulic system;

said shanks;

form locking guide-surface portions receiving said shanks; and a lever connected to said second hydraulic system and twisting said shanks.

10. The device according to claim 3, wherein after said jaws have been moved into said workpiece-contacting positions and before said clamping pistons have been locked in said working positions, said collet chuck adjusts into pivoting positions.

11. The device according to claim 3, wherein at least one of said pair of clamping levers is composed of:

a fixedly articulatable first arm: and a second arm variably connected to said fixedly articulatable first arm to define a variable width of said chuck opening.

12. The device according to claim 9, wherein after said jaws have been moved into said workpiece-contacting positions and before said clamping pistons have been locked in said working positions, said collet chuck adjusts into a pivoting position.

13. The device according to claim 9, including adjusting means adapted for adjusting a pivoting position of said collet chuck after said jaws have been moved into said workpiece-contacting positions and before said clamping pistons have been locked in said working positions.

14. The device according to claim 9, wherein said clamping levers are each composed of:

a fixedly articulatable first arm; and a second arm connected to said fixedly articulatable first arm, said second arms being connectable to said first arms at different mutual distances.

* * * * *